Dec. 29, 1964    O. BJERING ETAL    3,163,171
CONTAINER NECK WASHER

Filed July 29, 1963    6 Sheets-Sheet 1

INVENTOR.
OLAV BJERING
BY ALOIS F. TRENDEL
ATTORNEYS

INVENTOR.
OLAV BJERING
BY ALOIS F. TRENDEL
Philip M. Rice
& W. A. Schaich
ATTORNEYS Dec. 29, 1964  O. BJERING ETAL  3,163,171
CONTAINER NECK WASHER
Filed July 29, 1963  6 Sheets-Sheet 5

INVENTOR.
OLAV BJERING
BY ALOIS F. TRENDEL
ATTORNEYS

United States Patent Office 3,163,171
Patented Dec. 29, 1964

3,163,171
CONTAINER NECK WASHER
Olav Bjering and Alois F. Trendel, Toledo, Ohio, assignors to Owens-Illinois Glass Company, a corporation of Ohio
Filed July 29, 1963, Ser. No. 298,142
6 Claims. (Cl. 134—104)

This invention relates generally to apparatus for cleaning containers and more particularly to apparatus for cleaning the neck portion of containers after they have been filled with food or other commodities but before they have been sealed, as with a closure.

When containers, such as glass bottles and jars, are filled with foodstuffs on automatic filling lines, it is a common occurrence that a portion of such food spills over the side of the container. It is necessary that this excess material be removed from the outside of such container, particularly the neck portion, pior to the application of a closure thereon. This is especially true where threaded closures are placed on containers because any foodstuff which becomes entrapped between the closure and the container neck may act as an adhesive making the removal of the closure by the consumer exceedingly difficult. More important, where metal closures are used, such contamination may corrode the metal and render the foodstuff packaged in such container unfit for human consumption. Thus, it is necessary that the outside of the container neck portion be completely free of any packaged food before the closure is affixed thereto.

Accordingly, it is an object of this invention to provide apparatus for cleaning the neck portions of containers after filling but prior to the application of the closures thereto.

In cleaning the neck portions of containers which have been filled with foodstuffs or other materials, it is necessary to prevent any water or other cleaning agent from entering the container and contaminating the goods packaged therein. The problem of preventing contaminants from entering the filled containers during such cleaning is especially difficult where containers of a given size have variations in height or uneven finish portions to the extent permitted by commercial tolerance.

Accordingly, it is another object of this invention to provide apparatus for effectively sealing, during the washing operation, the mouths of containers formed with uneven finish portions.

When relatively long narrow items, such as olive pimentos for example, are packed it frequently happens that one or more of such items becomes caught on the rim so that a portion hangs into the container and a portion hangs outside. Obviously, merely washing the outside of such container will not be sufficient to remove the item so entrapped.

Therefore, it is a further object of this invention to provide apparatus adapted to shear off articles so entrapped during the neck cleaning operation.

Another object of this invention is to provide means for washing the sealing portion of the apparatus after its disengagement from each container.

The apparatus of the present invention utilizes a highly resilient belt which is urged downwardly into contact with the open mouths of the filled containers to seal the same during the washing operation. Inasmuch as the filled containers are moving on a conveyor, it is necessary that the shear or sealing belt move at the same speed as the container carrying conveyor as any variation in the relative speeds of the sealing belt and the conveyor may result in the tipping of filled containers. Occasionally it becomes necessary to stop the conveyor while the filled containers are being processed. Therefore, it is important that the relative speeds of the sealing belt and the conveyor are maintained constant even during the starting and stopping operations.

Accordingly, it is an important object of this invention to provide coupling means between the conveyor and the shear belt assembly to insure equal speeds between the conveyor and the sealing belt at all times.

It is an additional object of this invention to provide apparatus for sealing and washing containers which may be readily adjusted to handle containers of widely varying capacities and heights.

Other objects and advantages of this invention will become apparent from the following description taken in conjunction with the annexed sheets of drawings on which:

Figure 5:
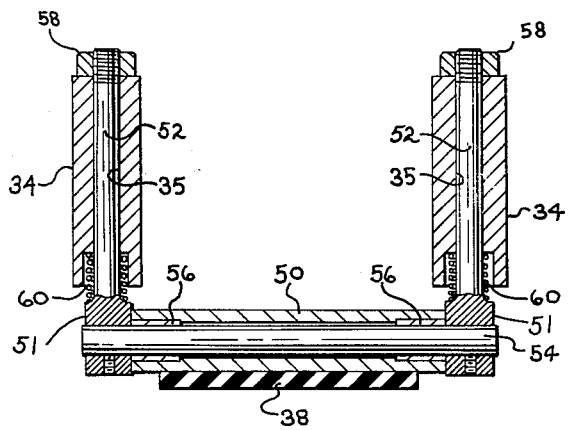
FIGURE 5 is a sectional view taken through line 5—5 of FIGURE 3.

In brief, the present invention comprises a conveyor, a shear belt assembly positioned above the conveyor, and a coupling assembly connected between the conveyor and the shear belt assembly to drive a sealing belt of the shear belt assembly. The shear belt assembly is vertically adjustable to permit proper spacing of the lower reach of the belt from the surface of the container carrying conveyor depending on the height of containers being processed. The coupling assembly transmits power from the conveyor to the belt so that its lower reach moves in the same direction and at the same speed as the conveyor. The lower reach of the belt is continuously urged into sealing engagement with the open mouths of the filled containers by a plurality of specially designed, highly resilient rolls. While the containers are thus sealed, cleaning fluid such as hot water is sprayed thereon, particularly around the neck portion to remove any material or contaminant which has spilled on the outside of the container. The shear belt assembly is provided with means for cleaning the contaminant from the belt when it is at the upper reach of its travel and thus disengaged from the containers.

Referring now to the drawings there is provided a shear belt assembly generally designated 10 positioned above a conveyor 14 adapted to carry containers 26 from a filling station to a capping station. A coupling assembly 12 has one end operably connected with a drive shaft 16 of the conveyor 14 and the other end connected to a drive shaft 18 of the shear belt assembly 10.

The conveyor 14 includes a sheave 20 mounted on drive shaft 16. An endless belt 22 is reaved about sheave 20 and a similar one (not shown) at the other end of the conveyor. The upper reach of the belt 22 rides on the top surface of a horizontal structural member 24. The belt 22 is thus adapted to carry the containers 26 under the shear belt assembly 10 while, by virtue of the support given by the horizontal structural member 24, maintaining them in a fixed plane. The conveyor drive shaft 16 may be powered by any conventional means.

The shear belt assembly 10 is supported by upright members 28 which are adjustably secured to the horizontal structural member 24 by means of bolts 32. Slots 30 in the upright members 28 permit any required vertical adjustment of the shear belt assembly 10.

The shear belt assembly 10 comprises a housing 37 having upstanding sidewalls 39. Structural members 34 extend longintudinally from each end of the sidewalls 39 and are secured to the upright members 28. Supported between structural members 34 at the entrance end of the housing 37 is a non-rotatable shaft 42 carrying a sheave 33. The sheave 33 has an integrally formed central housing 33a which is rotatably carried on the shaft by means of a bushing (not shown). The shaft 18 at the exit end is rotatably supported between the exit end structural members 34 by means of bushings 102 and carries a sheave 36. The sheave 36 has an integrally formed central housing 36a which is keyed to the shaft 18 for rotation therewith. A sealing belt 38 is reaved around the sheaves 33 and 36. The shaft 42 at the entrance end of the assembly is carried in a longitudinal slot 44 of the respective structural members 34. The slot 44 permits adjustment of the shaft 42, and, accordingly, the entrance sheave 33 away from the exit end shaft 18 to take up slack in the belt 38. Adjustment is effected by a bolt 46 threadedly engaged between the shaft 42, and the end wall of the slot 44.

Figure 1:
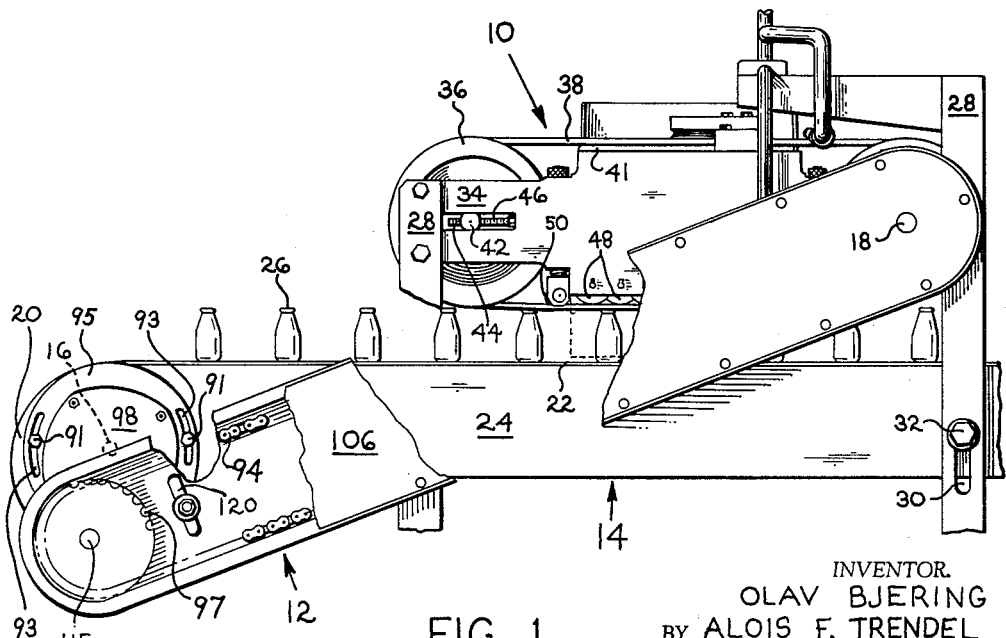
FIGURE 1 is an elevational view of the apparatus of the present invention.
Figure 2:
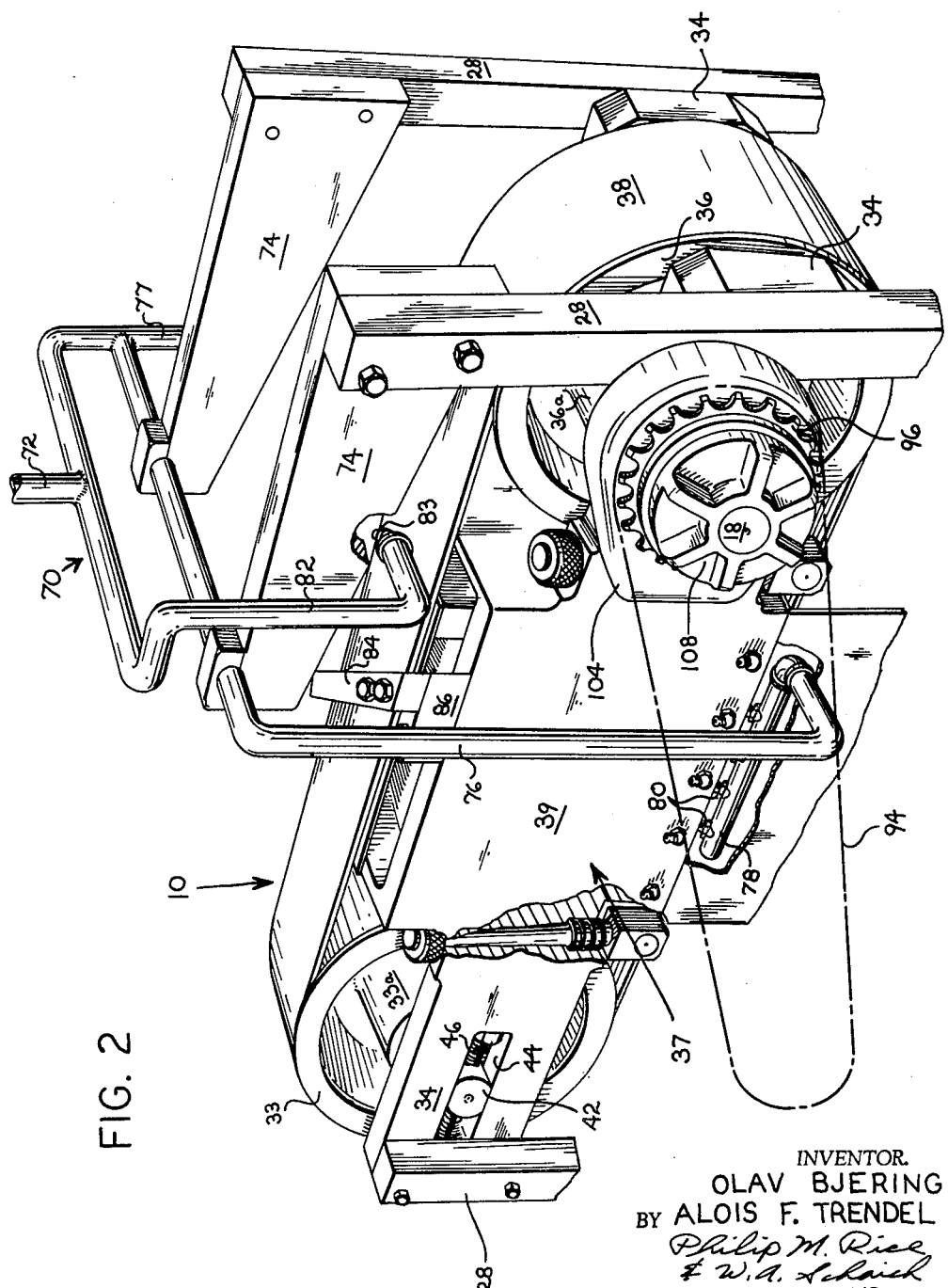
FIGURE 2 is a perspective view of the shear belt assembly portion of the present invention.
Figure 3:
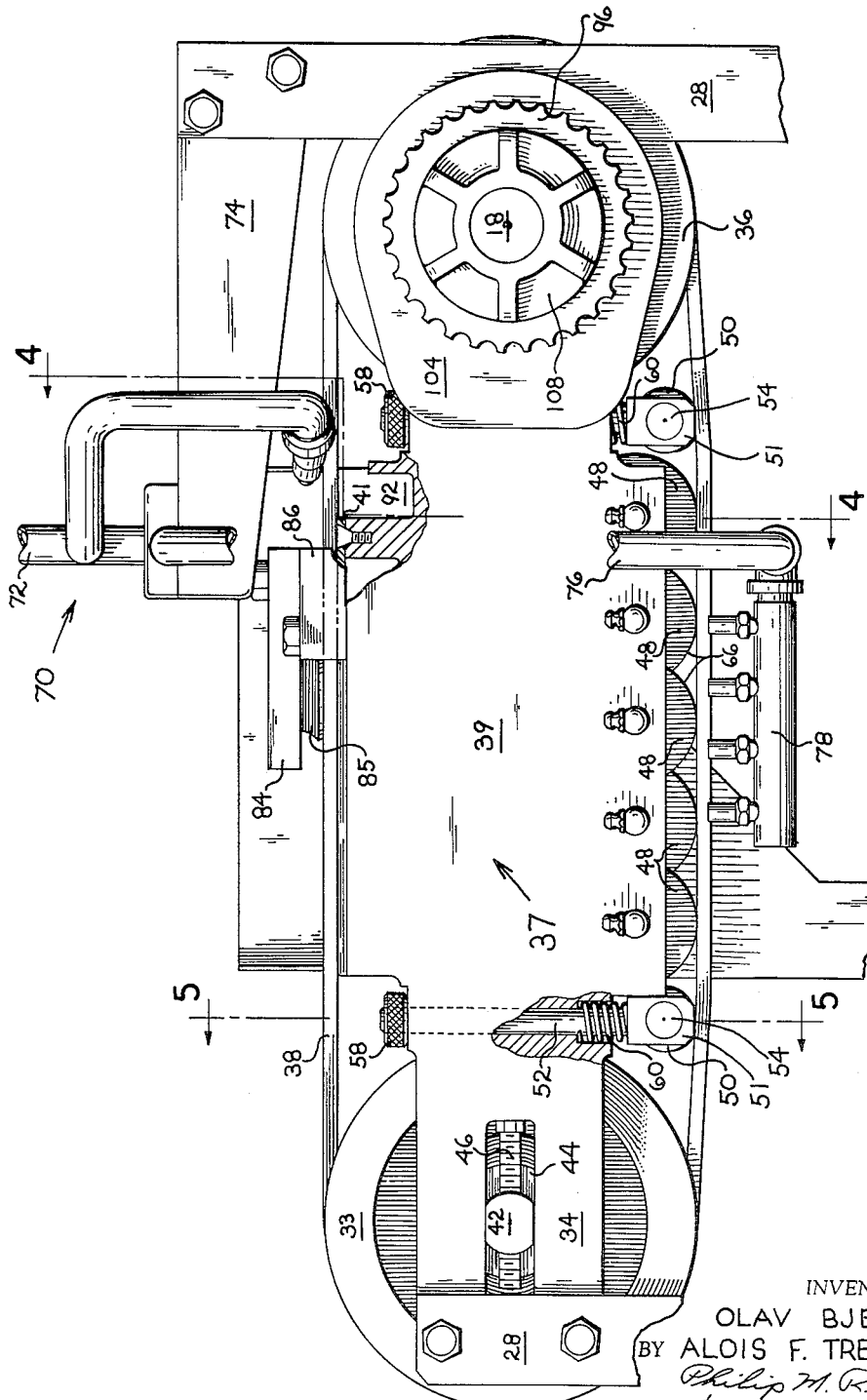
FIGURE 3 is an elevational view of the shear belt assembly portion of the present invention.

As may be seen in FIGURES 1 and 3, the lower reach of the belt 38 has a plurality of members resiliently urging it downwardly into sealing engagement with the container mouths. The members urging the belt against the container mouths include a plurality of fixed rollers 48 mounted laterally of the belt and a pair of spring loaded rollers 50 also positioned laterally of the belt, one at each end of the group of fixed rollers.

Referring to FIGURES 3 and 5, it may be seen that the spring loaded rollers 50 are supported between a pair of blocks 51 each of which is integrally formed at one end of a vertical shaft 52. Each of the shafts 52 extends through and is axially slidable in a bore 35 in its respective main structural member 34. A horizontal shaft 54 is carried between the blocks 51 and rotatably supports the roller 50 on bushings 56. The upper end of the vertical shafts 52 are threaded and are engaged by knobs 58 which permit vertical adjustment of the rollers 50. Compression springs 60 are positioned between the structural members 34 and the blocks 51 to continuously urge the rollers 50 to their lowermost position. The knobs 58 are adjusted so that the lower reach of the belt 38 passing under the roller 50 will lie in a plane somewhat lower than that of the tops of the containers. Upon engagement of the container mouth by the belt, the springs 60 permit the rollers 50 to raise slightly to allow the container to pass thereunder but continuously urge the belt surface into sealing engagement with the container mouth.

Figure 4:
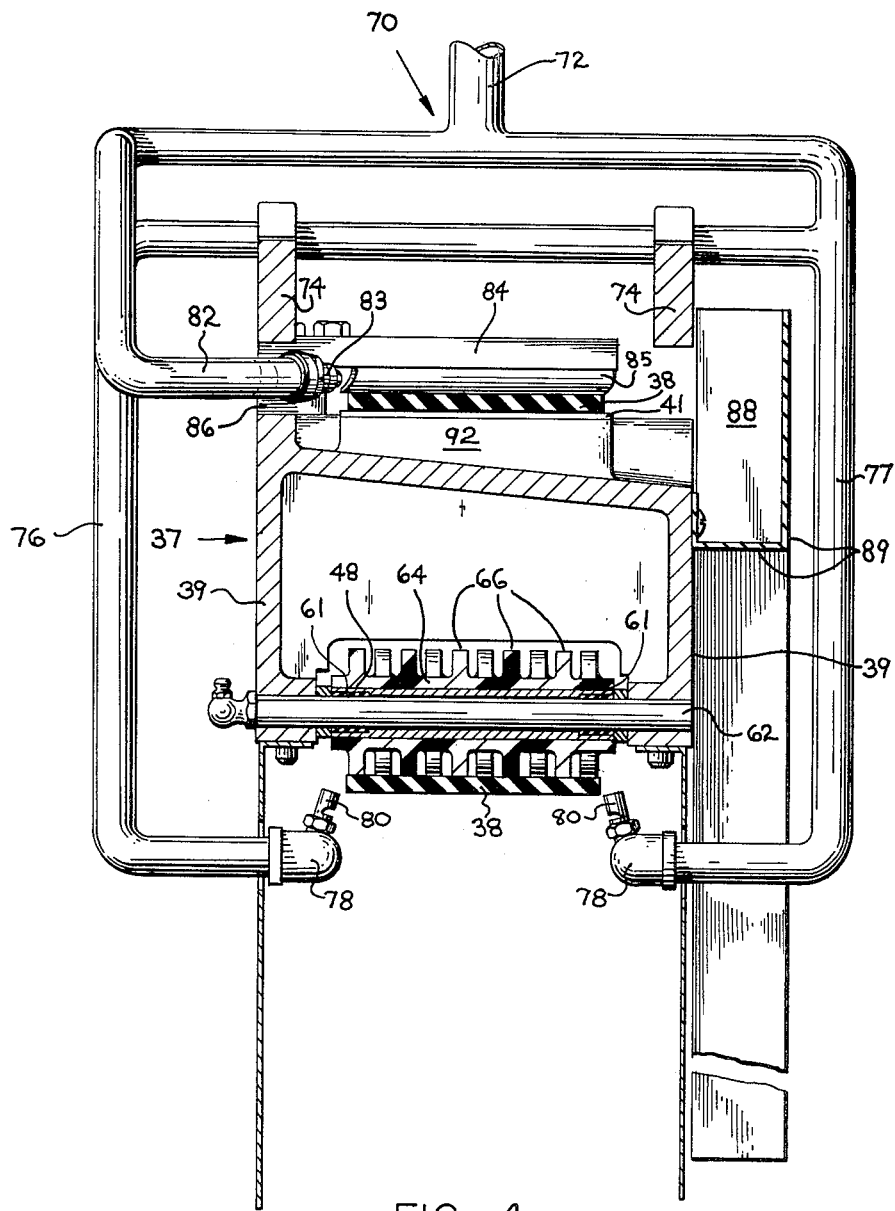
FIGURE 4 is a sectional view taken through line 4—4 of FIGURE 3.

Referring to FIGURE 4, each of the fixed rollers 48 rotates on bushings 61 carried on shafts 62 which extend between and are secured to the housing sidewalls 39. Each of the rollers is covered with a rubber sheath 64 having a plurality of highly resilient disks 66 integrally formed with said sheath and extending radially therefrom. As may be seen in FIGURE 4, the disks 66 are spaced apart sufficiently far to permit disks 66 of rollers on each side thereof (FIGURE 3) to be interlaced therewith thereby permitting closer spacing between said fixed rollers than would otherwise be possible. As a result of such interlacing, the sealing pressure being exerted between any given point on the belt and the container mouth continuously fluctuates. Vertical adjustment of the shear belt assembly 10 on the upright members 28 permits the lower reach of the belt 38 lying under the fixed rollers 48 to be positioned in a plane just below the plane defined by the mouths of the containers being processed. As a result of such positioning, the belt is urged by the resilient disks 66 into sealing engagement with the container mouths.

The shear belt assembly 10 is provided with a cleaning fluid transmission system generally designated 70 carried on a pair of support members 74 which are bolted to the exit end upright members 28. The system comprises a main supply line 72 and a plurality of branches extending therefrom. Two of the branches 76 and 77 are positioned on opposite sides of the shear belt assembly 10 and each has a horizontal pipe 78 extending therefrom which is positioned substantially parallel to the line of travel of the containers. Each of the horizontal pipes 78 has a plurality of nozzles 80 positioned to direct cleaning fluid on the containers, particularly in the neck area while the mouths of such containers are sealingly engaged by the belt 38. A third branch 82 has a nozzle 83 which directs cleaning fluid against the sealing surface of the belt 38 when it is at the upper reach of its travel. The cleaning fluid applied to the belt 38 in this area assists in removing any contaminant remaining on the belt so that the belt will be clean when it engages its next container.

A resilient squeegee 85 is urged against the sealing surface of the belt upper run to scrape the contaminant and the cleaning fluid emitted from nozzle 83 off the belt. The squeegee 85 is carried on a horizontal support member 84 which is bolted to one of the housing sidewalls 39 and spaced therefrom by means of a block 86 (FIGURE 3). The squeegee 85 directs the contaminant and cleaning fluid off the belt 38 into a waste channel 88 of a sheet metal structure 89 secured to one of the sidewalls 39. The upper reach of the belt 38 rides on a top plate 41 of the housing 37 and is urged thereagainst by the squeegee 85. The leading edge of the top plate 41 serves as a scraper to scrape any contaminant from the lower or inner surface of the belt upper reach. Thus, both surfaces of the belt 38 are cleaned substantially simultaneously. Contaminant scraped from the inner surface of the belt is directed to the waste channel 88 by means of a lateral channel 92 (FIGURE 4) formed in the housing.

Figure 6:
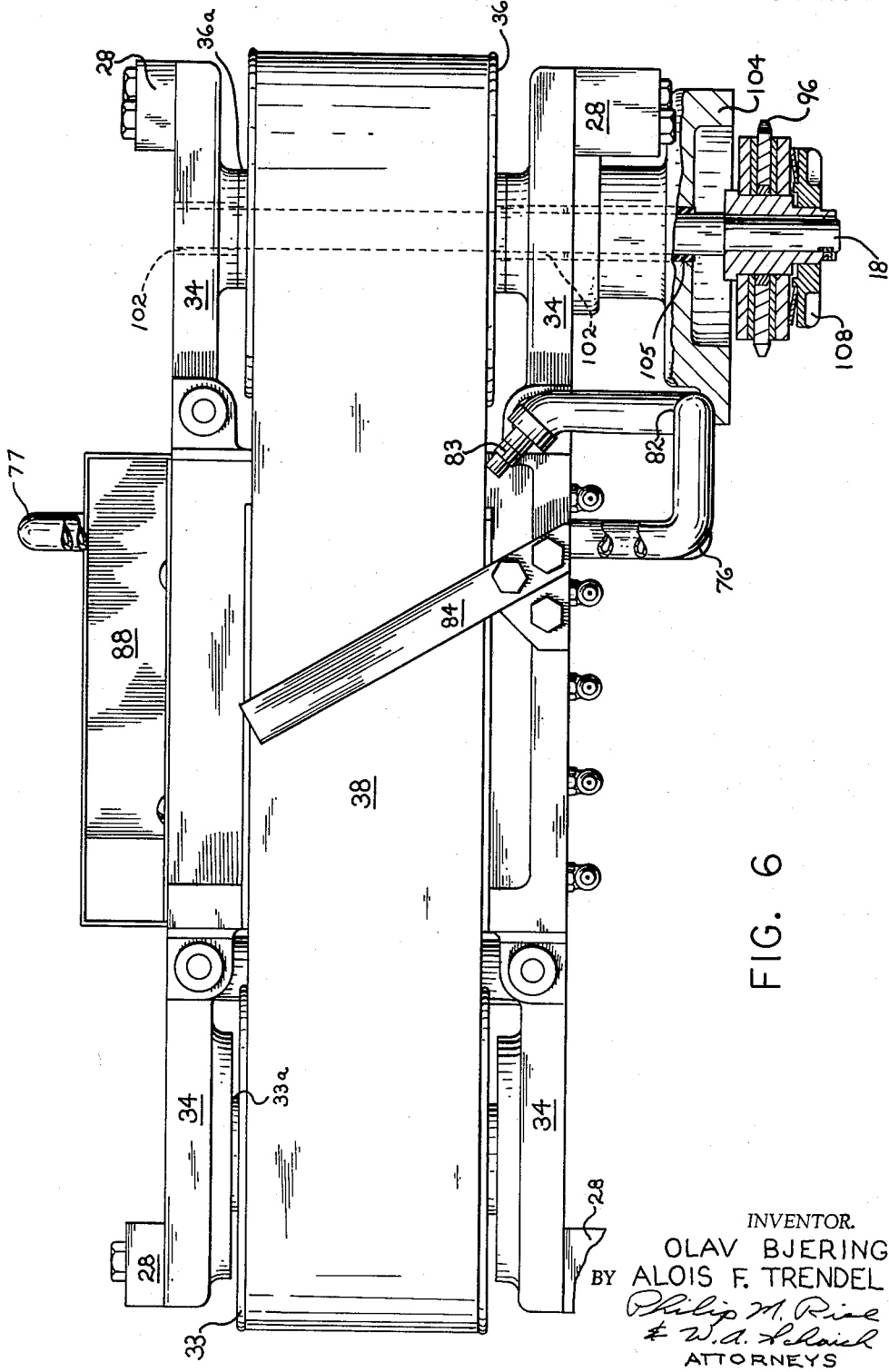
FIGURE 6 is a top plan view of the shear belt assembly.

Rotation of the shear belt assembly drive shaft 18 is caused by movement of a chain 94 reaved between a sprocket 96 keyed to the shaft 18 and a sprocket 97 mounted on stub shaft 115 extending from a gear box 98 of the coupling assembly 12. As previously described, the shaft 18 is rotatably supported between the structural members 34 at the exit end of the shear belt assembly 10. A housing 104 is carried on shaft 18 by means of bushings 105 (FIGURE 6) and functions to support a chain guard 106 (FIGURE 1) of the coupling assembly 12. A hub 108 holds the sprocket 96 on the shaft 18. The sprocket 96 is keyed to the shaft 18 in a conventional manner, so that the shaft rotates with the sprocket.

Figure 7:
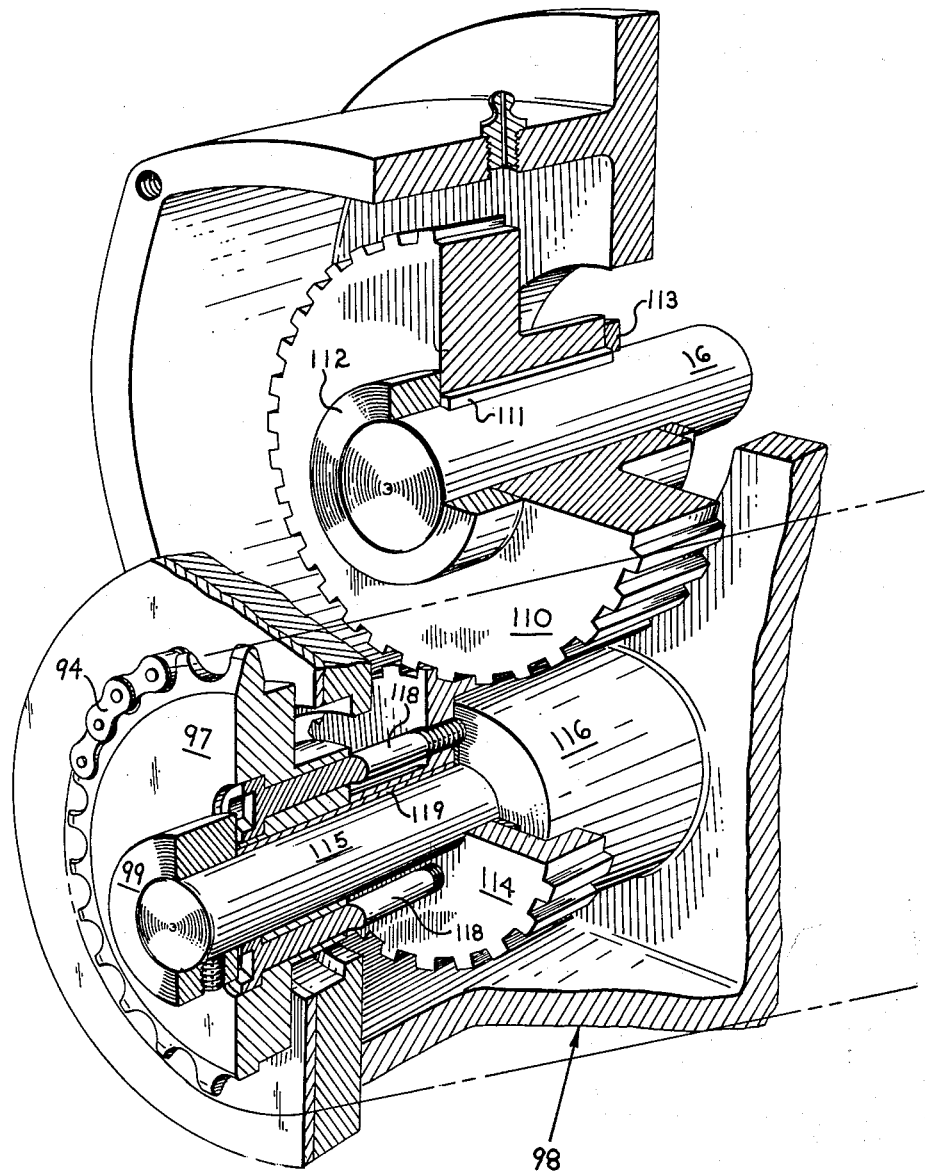
FIGURE 7 is a perspective view, partially broken away, of the gear box portion of the coupling which connects the conveyor drive means and the shear belt assembly.

Referring now to FIGURE 7 the coupling 12 includes a gear box 98 housing a gear 110 which is mounted for rotation with the conveyor drive shaft 16 by means of a key 111 positioned in aligned keyways of the shaft 16 and the gear 110, respectively. The gear 110 is secured to the shaft 16 by a collar 112 positioned on one side and a bushing 113 on the other. The gear 110 matingly engages another gear 114 which is rotatably supported on a stationary stub shaft 115 by means of a bushing 119. Support for the shaft 115 is provided by a tapered hub 116 integrally formed with and extending inwardly from the wall of the gear box 98. The sprocket 97, which is also mounted on stub shaft 115 and bushing 119, is secured for rotation with the gear 114 by means of bolts 118. A collar 99 holds the sprocket 97 in place on the shaft 115.

It will be readily apparent that the coupling 12, as thus described, and the gear box portion 98 in particular, by virtue of its unique construction permits the shear belt assembly to be adjusted vertically with respect to the conveyor 22 without lengthening or shortening the chain 94. Thus, vertical adjustment of the shear belt assembly 10 results in partial rotation of the gear 114 and box 98 around the shaft 16 and gear 110. The gear box is supported by a pair of bolts 91 engaging structural member 24 through a pair of arcuate slots 93 cut in a flange 95 of the gear box 98. The arcuate slots 93 permit the previously noted partial rotation which occurs during vertical adjustment of the shear belt assembly. The chain guard 106 (FIGURE 1) is secured between the housing 104 of the shear belt assembly 10 and the gear box 98. The chain guard 106 is provided with a slot 120 to accommodate the angular change which occurs during vertical adjustment of the shear belt assembly 10. The housing 104 is free to rotate as may be required by raising or lowering of the shear belt assembly 10.

In operation, the shear belt assembly 10 is initially adjusted so that the portion of the belt 38 underlying the fixed rollers 48 and spring loaded rollers 50 is positioned above the top surface of the conveyor belt 22 a distance which is slightly less than the height of the containers 26 being processed. However, the portions of the belt 38 underlying the sheaves 33 and 36 have sufficient clearance above the conveyor to permit the containers to move freely thereunder. The containers are received on the conveyor belt 22 after being filled with product at a filling station. The open mouths of the containers engage the sealing surface of the belt 38 just prior to reaching the first spring loaded roller 50 and push the roller upwardly against the spring 60. The spring loaded roller 50 continuously urges the belt 38 against the mouths of the respective containers. As the containers move under the fixed rollers 48, they continue to be sealingly engaged by the belt surface as a result of the continuous urging of the resilient disks 66 extending from the rubber sheaths 64. Concurrently with such sealing engagement by the belt 38, the containers are sprayed with water or other cleaning fluid emitting from the nozzles 80 to remove any contaminant from the exterior thereof, particularly the threaded neck portion. After the containers are out of reach of the spray, they pass under the second spring loaded roller 50 and then out of engagement with the belt 38. The belt travels around the exit and sheave 36 to reach the upper movement of its travel. While traveling through the upper reach it is cleaned by spray emitting from the upper nozzle 83 and scraped by the squeegee 85 and the leading edge of the top place 41. After passing under the squeegee 85 it is then ready to engage another container.

It may be readily seen from the foregoing description that the present invention provides apparatus for effectively cleaning the exteriors of containers which have been filled with a product while preventing contamination of such product. The apparatus of the present invention can readily handle containers of widely varying heights merely by raising or lowering the shear belt assembly with respect to the conveyor belt. By virtue of the unique coupling means which permits the housing to rotate about the axis of the conveyor shaft, the adjustment for varying container heights may be accomplished without the time-consuming lengthening or shortening of the chain 94 which would otherwise be required to preserve the essential feature of maintaining constant speeds between the conveyor belt 22 and the sealing belt 30.

It is obvious that many changes and modifications may be made in this apparatus without departing from its spirit and scope which is to be limited only by the following claims.

We claim:

1. Apparatus for temporarily sealing container mouths comprising: a conveyor for moving upright containers along a predetermined path, said conveyor including a driven shaft; sealing means for sealing the mouths of said containers along a portion of said path, said means comprising a sealing belt reaved about at least two sheaves, one of which is driven; mounting means for supporting said sealing means above said conveyor including means for vertically adjusting said sealing means relative to said conveyor, said sealing means being in a fixed position relative to the length of said conveyor; a rotatable member; driven means operatively connecting for power transmission said driven sheave to said rotatable member; means operatively connecting for power transmission said rotatable member and said driven shaft; and means for mounting said rotatable member for rotation about its axis and rotation about said driven shaft whereby on vertical adjustment of said sealing means, said rotatable member will rotate about the axis of said driven shaft.

2. The apparatus defined in claim 1 wherein the distance between the axis of said rotatable member and the axis of said driven sheave remains constant during vertical adjustment of said sealing means.

3. Apparatus for cleaning container exteriors comprising: a conveyor for moving upright containers along a predetermined path, said conveyor including a driven shaft; a shear belt assembly for sealing the mouths of said containers including at least two rotatable sheaves, one of which is driven, a sealing belt reaved about said sheaves, means engaging the lower reach of said sealing belt to urge the same into sealing engagement with the mouths of said containers, means for cleaning said belt when out of container engagement; mounting means for supporting said shear belt assembly above said conveyor in a fixed position relative to the length of said conveyor including means for vertically adjusting said shear belt assembly relative to said conveyor; a rotatable member; driven means operatively connecting for power transmission said driven sheave to said rotatable member; means operatively connecting for power transmission said rotatable member and said driven shaft; means for mounting said rotatable member on said conveyor for rotation about its axis and rotation about said driven shaft whereby on vertical adjustment of said shear belt assembly, said rotatable member will rotate about the axis of said driven shaft; and means for cleaning said containers while they are engaged by said sealing belt.

4. The apparatus defined in claim 3, further including means for cleaning said belt comprising supply means directing cleaning fluid to said belt while it is at the upper reach of its travel, and scraper means engaging both surfaces of said belt after it has received said cleaning fluid.

5. For use in apparatus for temporarily sealing container mouths wherein containers are moved along a predetermined path on a conveyor having a driven shaft and their mouths are engaged by a sealing belt moving in the same direction and at the same speed as said containers, said sealing belt being reaved about at least two sheaves, one of which is driven, said sheaves being mounted for vertical adjustment relative to said conveyor and being in a fixed position relative to the length thereof, a coupling assembly for transmitting power from said conveyor driven shaft to one of said sheaves comprising a rotatable member, driven means operatively connecting for power transmission said driven sheave to said rotatable member, means operatively connecting for power transmission said rotatable member and said conveyor driven shaft, and means for mounting said rotatable member for rotation about its axis and rotation about said conveyor driven shaft whereby on vertical adjustment of said sheaves, said rotatable member will rotate about the axis of said driven shaft so that the distance between said rotatable member and said driven sheave remains constant.

6. The apparatus defined in claim 4 further including means for removing said cleaning fluid from said belt upper reach while preventing its contact with said containers.

References Cited in the file of this patent
UNITED STATES PATENTS

| | | |
|---|---|---|
| 351,190 | Mayberry | Oct. 19, 1886 |
| 1,503,034 | Dalrymple | July 29, 1924 |
| 1,793,246 | Philips | Feb. 17, 1931 |
| 2,455,675 | Hawk | Dec. 7, 1948 |